Patented Oct. 17, 1922.

1,431,938

UNITED STATES PATENT OFFICE.

HENRY V. DUNHAM OF MOUNT VERNON, NEW YORK, ASSIGNOR TO DRY OIL PRODUCTS COMPANY, OF LONDON, ENGLAND, A COMPANY OF GREAT BRITAIN.

PULVERULENT SHORTENING AGENT AND PROCESS OF MAKING SAME.

No Drawing. Application filed October 27, 1919, Serial No. 333,696. Renewed March 4, 1922. Serial No. 541,195.

*To all whom it may concern:*

Be it known that I, HENRY V. DUNHAM, a citizen of the United States of America, residing at Mount Vernon, in the county of Westchester and State of New York, have invented certain new and useful Improvements in Pulverulent Shortening Agents and Processes of Making Same, of which the following is a specification.

The present invention relates to the production of a material containing an edible oil disseminated throughout the body of a suitable carrier, which product is suitable for many purposes, among which may be mentioned its use as a vehicle for introducing oils (either liquid oils or solid fats being included within this term) into food products, such as bread, biscuit, cake and the like. The object is accomplished, as stated below, with a starchy material (under which term I include not only pure starch, but flour and other materials consisting largely of starch, dextrin or like materials). In products of this character, in order to be commercial, a major part of the entire mass should preferably consist of the oil, for which the other ingredients present form the vehicle. It is found necessary to produce a product, which will be dry, finely pulverized, and relatively stable, so that the material can be kept for a reasonable length of time (for example on the shelves of a grocery store, and in the kitchen of the consumer) without undergoing undesirable fermentation or oxidation, and it is to be borne in mind that all oils and fats commonly used in cooking are more or less liable to rancidification or are liable to grow stale or acquire a strong and unpleasant flavor when the same are kept for long periods of time, and this tendency is heightened by intimate contact of the oily material, with air, and especially air containing moisture.

Accordingly, in carrying out the process embraced within the present invention, it is necessary to produce a thorough and intimate contact of the oil with the starchy material, and this should be done in such a way that minute globules of oil are surrounded by a casing or membrane or envelope of such a nature that the oil is, as it were, locked up in the form of minute capsulated bodies, that is to say, fine particles of oil, each enveloped in a sheath of dried starchy substance.

In accordance with the present invention, I first mix the starchy material with water to form a freely liquid mass, for example to one part of dry wheat flour of any of the commercial grades, I add about ten parts of water. This mixture is then thoroughly boiled to form what is substantially a solution. This solution is mixed with the oil and the oil completely emulsified in the mixture, it being understood that the mixture is at this stage at such a temperature that the oil itself is thoroughly liquid. For example, with the amount of liquid above stated, I find that two parts, or slightly more, of cocoanut oil (to one part of starch or flour) can be conveniently employed, in this particular example the oil being added to the liquid when the same is at a temperature of about 100° C.

In order to greatly reduce the size of the oil particles, it is necessary at this stage to pass the mixture through a homogenizer so that a milky fluid (thick liquid) is produced. The amount of pressure employed in passing the liquid through the homogenizer will depend upon the proportion of oil to liquid, the character of the specific oil employed and other conditions, pressures between 4500 and 8000 pounds being generally suitable. It is, of course, understood that the pressure to be used is adjusted by tightening up or loosening the discs of the homogenizer. The liquid, being then in the form of a milky liquid or very completely homogeneous liquid carrying extremely minute oil particles, is then dried on a suitable milk drier, for example the well known double cylinder Just Drier. The flaky product of the drying operation is then reduced to a powder, the particles of which may be comparable in size to the particles of ordinary flour.

It is to be understood that in place of flour, other starchy materials, as above described, may be employed, and in place of cocoanut oil, other varieties of edible oil or fat may be employed, this being merely given as one example of an edible oil to which the process is applicable.

In another form of execution of the process, the oil may be initially mixed with, or added to the mixture of starchy material and water, before the same is boiled, and after the mixture of water, flour and oil has been boiled in the mixture, the mass is then emulsified in the usual manner, and then homogenized and dried.

It will be understood that other materials, such as seasoning or flavoring materials, may be added at any convenient stage of the process.

The homogenization of the emulsion should, of course, be effected while the oil is in a thoroughly molten condition. For this purpose, when using cocoanut oil, or other normally solid oils, it is advisable to emulsify the oil in the liquid, while the same is hot, and the homogenization is likewise carried out while the mixture is hot. The dried product can be stored and shipped in any suitable relatively air-tight package, paraffined cartons being entirely suitable.

In using the dried pulverulent product the same is mixed with flour, and preferably sifted therewith, the other ingredients to be used in making the dough added in the usual way and the making of the bread, biscuit or other food product continued in the usual way. This product can also be used in making some varieties of cake and pastry, particularly when extreme lightness is not necessary.

In some cases it is advisable to add a small quantity of acid, or an acid salt, to the material at some stage prior to the drying operation. This has the effect of reducing the quantity of baking powder, which is necessary to be used in making biscuits and the like. This acid material may be added at the time of boiling the starchy material, such as flour, with water. In this instance, the acid will assist substantially by dextrinizing the starch to a considerable extent, and also it tends to convert the gluten into more soluble proteids. Gluten may also be added to increase the amount normally present in the flour.

Whether the acid is employed or not, it is sometimes advisable to add to the liquid material, before adding the oil, a suitable quantity of milk, dried milk, casein or alkali-casein to aid in emulsifying the oil (see my prior U. S. Patents 1,302,486 and 1,302,487).

Such an amount as 5% to 20% relative to the amount of flour or starch, is suitable, although larger or smaller amounts can be used if desired.

I claim:

1. A process which comprises boiling starchy material in water, emulsifying an ingestible oil therein, homogenizing the emulsion and drying the product.

2. A process which comprises homogenizing an edible oil with a starchy material boiled in water, and drying the product.

3. A process which comprises boiling starchy material in water, emulsifying a normally solid oil therein while in a heated state, homogenizing the emulsion and drying the product.

4. A process which comprises boiling flour and water, adding an oil, such operations being performed in any desired order, emulsifying the mixture, homogenizing the emulsion, and drying.

5. A process which comprises boiling one part of flour in about ten parts of water, adding about two parts of cocoanut oil, such operations being performed in any desired order, emulsifying the mixture, homogenizing and drying.

6. A dried pulverulent mixture comprising fatty oil disseminated through a boiled starchy material, such product being stable substantially as described.

7. A dried pulverulent mixture comprising normally solid edible fatty oil disseminated through boiled flour, such product being stable, substantially as described.

In testimony whereof I affix my signature.

HENRY V. DUNHAM.